United States Patent
Lord et al.

(10) Patent No.: US 8,858,804 B2
(45) Date of Patent: *Oct. 14, 2014

(54) STORM WATER PRETREATMENT CHAMBER

(71) Applicant: Anoka Conservation District, Ham Lake, MN (US)

(72) Inventors: Christopher Allen Lord, Coon Rapids, MN (US); Shawn Patrick Tracy, St. Paul, MN (US); Nathan Scott Zwonitzer, Lino Lakes, MN (US)

(73) Assignee: Anoka Conservation District, Ham Lake, MN (US)

( * ) Notice: Subject to any disclaimer, the term of this patent is extended or adjusted under 35 U.S.C. 154(b) by 124 days.

This patent is subject to a terminal disclaimer.

(21) Appl. No.: 13/957,256

(22) Filed: Aug. 1, 2013

(65) Prior Publication Data

US 2013/0313205 A1    Nov. 28, 2013

Related U.S. Application Data

(63) Continuation of application No. 13/036,317, filed on Feb. 28, 2011, now Pat. No. 8,501,016.

(51) Int. Cl.
| | |
|---|---|
| *E03F 5/06* | (2006.01) |
| *E03F 5/14* | (2006.01) |
| *B01D 35/02* | (2006.01) |
| *E03F 5/04* | (2006.01) |
| *E03F 5/10* | (2006.01) |
| *C02F 1/00* | (2006.01) |
| *C02F 103/00* | (2006.01) |

(52) U.S. Cl.
CPC ............... *E03F 5/10* (2013.01); *E03F 5/0404* (2013.01); *E03F 5/14* (2013.01); *B01D 35/02* (2013.01); *E03F 5/0403* (2013.01); *C02F 1/004* (2013.01); *C02F 2103/001* (2013.01)
USPC ........ 210/747.3; 210/115; 210/162; 210/163; 210/170.03; 210/335; 210/474

(58) Field of Classification Search
USPC ........ 210/747.2, 747.3, 747.5, 767, 806, 155, 210/162, 163, 164, 170.03, 170.1, 335, 474
See application file for complete search history.

(56) References Cited

U.S. PATENT DOCUMENTS

| | | | | |
|---|---|---|---|---|
| 1,041,887 | A | * | 10/1912 | Schodde ............... 210/163 |
| 1,693,977 | A | * | 12/1928 | Egan ................. 210/163 |
| 4,781,796 | A | | 11/1988 | Bridle et al. |
| 5,322,629 | A | | 6/1994 | Stewart |
| 5,533,303 | A | | 7/1996 | Harvey |
| 6,200,484 | B1 | * | 3/2001 | McInnis .......... 210/170.03 |
| 6,277,274 | B1 | | 8/2001 | Coffman |
| 6,569,321 | B2 | | 5/2003 | Coffman |
| 7,025,879 | B1 | | 4/2006 | Ticknor |
| 7,041,213 | B1 | | 5/2006 | McClanahan |
| 7,056,058 | B2 | | 6/2006 | Urriola et al. |
| 7,105,086 | B2 | | 9/2006 | Saliba |

(Continued)

*Primary Examiner* — Christopher Upton
(74) *Attorney, Agent, or Firm* — Mitchell A. Rossman; Terra Nova Patent Law, PLLC

(57) ABSTRACT

A storm water pretreatment chamber is provided. The storm water pretreatment chamber includes; one or more filter sidewalls; one or more optional water-impermeable sidewalls; one or more optional chamber grates; and one or more catch rails. Methods of treating storm water are also provided.

20 Claims, 12 Drawing Sheets

(56) References Cited

U.S. PATENT DOCUMENTS

| | | | |
|---|---|---|---|
| 7,128,832 B2 * | 10/2006 | Wade | 210/155 |
| 7,270,747 B2 * | 9/2007 | Happel et al. | 210/162 |
| 7,276,156 B2 * | 10/2007 | Lockerman et al. | 210/162 |
| 7,452,165 B2 | 11/2008 | Tyler | |
| 7,645,390 B1 | 1/2010 | McClanahan | |
| 7,699,557 B2 | 4/2010 | Shaw et al. | |
| 7,776,217 B2 | 8/2010 | Lucas | |
| 7,799,235 B2 | 9/2010 | Olson et al. | |
| 7,985,335 B2 * | 7/2011 | Allard | 210/155 |
| 2006/0016767 A1 | 1/2006 | Olson et al. | |
| 2009/0101555 A1 | 4/2009 | Scarpine et al. | |
| 2009/0261026 A1 | 10/2009 | Grewal et al. | |
| 2009/0290936 A1 | 11/2009 | Underwood | |
| 2010/0212755 A1 | 8/2010 | Gear | |

* cited by examiner

600

```
┌─────────────────────────────┐
│  Passing Storm Water Through │
│  a Storm Water Pretreatment  │
│           Chamber            │
└─────────────────────────────┘
              │
              ▼
┌─────────────────────────────┐
│    Separating the Floating   │
│   Debris and the Sediment    │
└─────────────────────────────┘
```

STORM WATER PRETREATMENT CHAMBER

RELATED APPLICATIONS

This application is a continuation application of U.S. patent application Ser. No. 13/036,317 filed Feb. 28, 2011, which is hereby incorporated by reference in its entirety for all purposes.

BACKGROUND OF THE INVENTION

When it rains on unimproved natural land, the rain and stormwater runoff is either absorbed into the soil or moves along the surface of the land, moving downward towards creeks and rivers. However, as areas become more densely populated, this natural dispersion of rain and stormwater is altered by the man-made improvements, for example, parking lots, roads, and buildings. This leaves less open ground surface to absorb the rain and adds to the stormwater runoff.

In many cities, stormwater sewers are constructed to handle the large amount of stormwater runoff that comes off of the buildings, parking lots, and roads. The stormwater sewers route the water to creeks and drainage ditches, which form the tributaries to larger rivers. However, many cities do not have a stormwater sewer system; therefore, there is no pathway for disposing of the stormwater runoff coming from the buildings, parking lots, roadways, etc.

Common ways of treating storm water involve installing a curb-cut on a side of a street and allowing the storm water to flow out into a rain garden. However, debris can build up and cause the storm water to by-pass the curb cut before the rain garden is full of storm water. In addition, accumulated sediment in the rain garden can smother the existing plants and is unsightly. For example, turf strips along the curb-cut are often ineffective and require exhaustive raking and annual replacement. Rock inlets also lose their effectiveness rapidly without frequent labor intensive cleaning. Alternative structures, for example, chambers filled with porous media and underdrains, can be cost prohibitive and may fail resulting in flooding the rain garden with debris, which requires extensive clean-up.

What is desired is a device that can remove debris and sediment from storm water and allow the treated storm water to enter a storm water receiving feature, for example, a rain garden.

SUMMARY OF THE INVENTION

The present invention provides a storm water pretreatment chamber for storm water receiving features such as rain gardens. The storm water pretreatment chamber installs easily, simplifies routine maintenance, maximizes functional capacity, and extends the life of the storm water receiving features. The storm water pretreatment chamber is easy to construct, functional, and affordable. The storm water pretreatment chamber eliminates premature rain garden bypass of the untreated storm water due to sediment and debris accumulation. The storm water pretreatment chamber captures both large debris and fine particles. Additionally, the storm water pretreatment chamber contains an overflow feature that ensures treatment of the storm water in spite of neglected maintenance. The storm water pretreatment chamber includes a filter that can be easily removed and swept or rinsed clean with a garden hose. Further, sediment, leaves, and grass clippings, which are trapped inside the storm water pretreatment chamber, are easily removed with, for example, a shovel. The storm water pretreatment chamber is also easily and quickly installed into new or existing storm water receiving features.

The present invention provides a storm water pretreatment chamber. The storm water pretreatment chamber includes:
one or more filter sidewalls;
one or more optional water-impermeable sidewalls each independently connected to the one or more filter sidewalls;
wherein the one or more filter sidewalls and the one or more optional water-impermeable sidewalls form a debris and sediment trap,
wherein the one or more filter sidewalls are each in communication with the atmosphere and in position to release treated storm water from the debris and sediment trap into one or more storm water receiving features;
one or more optional chamber grates each having a first surface and a second surface, wherein each second surface of the one or more optional chamber grates is on or connected with the one or more filter sidewalls or the one or more filter sidewalls and the one or more optional water-impermeable sidewalls,
wherein the one or more optional chamber grates are in communication with the atmosphere and in position to receive untreated storm water and to collect one or more floating debris that does not pass through the one or more optional chamber grates; and
one or more catch rails each independently connected to the one or more filter sidewalls or the one or more optional water-impermeable sidewalls to form an open top in the storm water pretreatment chamber,
wherein the one or more catch rails are configured to provide one or more openings directed away from the one or more storm water receiving features,
wherein the one or more catch rails each independently catch the one or more floating debris,
wherein the one or more catch rails are positioned above a level of one or more storm water conveyances;
wherein the open top in the storm water pretreatment chamber is positioned below the level of the one or more storm water conveyances,
wherein the storm water pretreatment chamber has an opening between the one or more filter sidewalls, the one or more catch rails, and the one or more optional chamber grates that enables storm water to flow out of the debris and sediment trap and into the one or more storm water receiving features when the one or more filter sidewalls is clogged.

In one embodiment, the storm water pretreatment chamber further includes a base having a first surface and a second surface, wherein the first surface is connected to the ground adjacent the one or more storm water receiving features, wherein the second surface contacts the one or more filter sidewalls and the one or more optional water-impermeable sidewalls.

In one embodiment, the base includes a water-impermeable base. In one embodiment, the water-impermeable base includes concrete, stone, asphalt, brick, plastic, rubber, fiberglass, metal, wood, wood and plastic composite, or a combination thereof. In one embodiment, the water-impermeable base includes concrete.

In one embodiment, the base includes a water-permeable base. In one embodiment, the water-permeable base includes coarse sand, crushed stone, crushed glass, shredded bark, landscape fabric, compost, one or more living plants, permeable asphalt, permeable concrete, or a combination thereof.

In one embodiment, the one or more optional water-impermeable sidewalls include one or more wood-plastic composite sheets, one or more metal sheets, one or more cement fiberboards, one or more fiberglass sheets, one or more pressure-treated wood planks, one or more plastic sheets, one or more concrete sheets, or a combination thereof. In one embodiment, the one or more optional water-impermeable sidewalls include one or more wood-plastic composite sheets.

In one embodiment, the one or more filter sidewalls include one or more filters. In one embodiment, the one or more filters each independently including one or more metal screens, one or more plastic screens, one or more fiberglass screens, one or more non-woven screens, one or more coated woven fiberglass screens, one or more synthetic sponge screens, one or more treated natural fiber screens, or a combination thereof.

In one embodiment, the one or more filters each independently include one or more plastic coated woven fiberglass screens, one or more rubber coated woven fiberglass screens, or one or more plastic and rubber coated woven fiberglass screens in an anodized aluminum frame. In one embodiment, the one or more filters each independently include openings that are smaller than the openings in the one or more optional chamber grates.

In one embodiment, the one or more filters each independently include one or more removable filters. In one embodiment, the one or more filters each independently include one or more non-removable filters. In one embodiment, the one or more removable filters are disposable. In one embodiment, the one or more removable filters are reusable. In one embodiment, the one or more removable filters are removed to allow for removal of one or more debris, one or more sediments, or one or more debris and one or more sediments in the debris and sediment trap.

In one embodiment, the one or more filter sidewalls include a concrete form.

In one embodiment, the storm water pretreatment chamber further includes one or more piers each supporting the one or more filter sidewalls, the one or more optional water-impermeable sidewalls, the one or more optional chamber grates, the one or more catch rails, or a combination thereof. In one embodiment, the one or more piers include one or more cement materials, one or more concrete materials, one or more stone materials, one or more brick materials, one or more wood-plastic composite materials, one or more metals, one or more cement fiberboard materials, one or more fiberglass materials, one or more pressure-treated wood materials, one or more plastic materials, or a combination thereof. In one embodiment, the one or more piers include one or more wood and plastic composite materials.

In one embodiment, the debris and sediment trap collects materials that are smaller than the openings of the one or more optional chamber grates and larger than the openings in the one or more filter sidewalls. In one embodiment, the one or more optional chamber grates are removable. In one embodiment, the one or more optional chamber grates are non-removable.

In one embodiment, the one or more optional chamber grates include one or more cement materials, one or more concrete materials, one or more stone materials, one or more brick materials, one or more wood-plastic composite materials, one or more metals, one or more cement fiberboard materials, one or more fiberglass materials, one or more pressure-treated wood materials, one or more plastic materials, or a combination thereof.

In one embodiment, the one or more optional chamber grates include one or more metals. In one embodiment, the one or more metals include aluminum, steel, iron, or a combination thereof. In one embodiment, the one or more metals include galvanized steel, galvanized iron, or a combination thereof.

In one embodiment, the one or more optional chamber grates cover the debris and sediment trap or the debris and sediment trap and a space between the one or more filter sidewalls and the one or more catch rails adjacent to the one or more storm water receiving features.

In one embodiment, the one or more catch rails include one or more wood-plastic composite sheets, one or more metal sheets, one or more cement fiberboards, one or more fiberglass sheets, one or more pressure-treated wood planks, one or more plastic sheets, or a combination thereof. In one embodiment, the one or more catch rails each independently include one or more wood-plastic composite sheets.

In one embodiment, the storm water pretreatment chamber includes a chamber grate, one filter sidewall, three optional water-impermeable sidewalls, and three catch rails, wherein the three catch rails are configured to provide an opening into the storm water pretreatment chamber opposite to one storm water receiving feature.

In one embodiment, the storm water pretreatment chamber includes a chamber grate, two filter sidewalls, two optional water-impermeable sidewalls, and two catch rails, wherein the two catch rails are configured to provide two openings perpendicular to two storm water receiving features.

In one embodiment, the storm water pretreatment chamber includes a chamber grate, one filter sidewall, one water-impermeable sidewall, and two catch rails, wherein the two catch rails are configured to provide an opening into the storm water pretreatment chamber opposite to one storm water receiving feature.

In one embodiment, the storm water pretreatment chamber includes a chamber grate, one circular filter sidewall, and one catch rail, wherein the one catch rail is configured to provide an opening into the storm water pretreatment chamber opposite to one storm water receiving feature.

The present invention provides a storm water pretreatment chamber. The storm water pretreatment chamber includes:
 a filter sidewall;
 three water-impermeable sidewalls each independently connected to the filter sidewall;
 wherein the filter sidewall and three water-impermeable sidewalls form a debris and sediment trap,
 wherein the filter sidewall is in communication with the atmosphere and in position to release treated storm water from the debris and sediment trap into a storm water receiving feature;
 a chamber grate having a first surface and a second surface, wherein the second surface of the chamber grate is on or connected with the filter sidewall or the filter sidewall and the three water-impermeable sidewalls,
 wherein the chamber grate is in communication with the atmosphere and in position to receive untreated storm water and to collect one or more floating debris that does not pass through the chamber grate; and
 three catch rails each independently connected to the filter sidewall or the three water-impermeable sidewalls to form an open top in the storm water pretreatment chamber,
 wherein the three catch rails are configured to provide an opening into the storm water pretreatment chamber opposite from the storm water receiving feature,
 wherein the three catch rails each independently catch the one or more floating debris,
 wherein the three catch rails are positioned above the level of a storm water conveyance;
 wherein the open top in the storm water pretreatment chamber is positioned below the level of the storm water conveyance, wherein the storm water pretreatment chamber has an opening between the filter sidewall, the three catch rails, and the chamber grate that enables storm water to flow out of the debris and sediment trap and into the storm water receiving feature when the filter sidewall is clogged.

In one embodiment, the storm water pretreatment chamber further includes a base having a first surface and a second surface, wherein the first surface is connected to the ground adjacent the storm water receiving feature, wherein the second surface contacts the filter sidewall and the three water-impermeable sidewalls. In one embodiment, the base includes a concrete slab. In one embodiment, the three water-impermeable sidewalls include one or more wood-plastic composite sheets. In one embodiment, the filter sidewall includes one or more plastic coated woven fiberglass screens, one or more rubber coated woven fiberglass screens, or one or more plastic and rubber coated woven fiberglass screens in an anodized aluminum frame.

In one embodiment, the filter sidewall includes openings that are smaller than the openings in the chamber grate. In one embodiment, the filter sidewall includes one or more removable filters. In one embodiment, the one or more removable filters are removed to allow for removal of one or more debris, one or more sediments, or one or more debris and one or more sediments in the debris and sediment trap.

In one embodiment, the storm water pretreatment chamber further includes four piers each supporting the three water-impermeable sidewalls, the filter sidewall, the chamber grate, the three catch rails, or a combination thereof. In one embodiment, the four piers include one or more wood and plastic composite materials. In one embodiment, the debris and sediment trap collects materials that are smaller than the openings of the chamber grate and larger than the openings in the filter sidewall.

In one embodiment, the chamber grate is removable. In one embodiment, the chamber grate includes galvanized steel, galvanized iron, or a combination thereof. In one embodiment, the chamber grate covers the debris and sediment trap or the debris and sediment trap and a space between the filter sidewall and the three catch rails adjacent to the one or more storm water receiving features. In one embodiment, the three catch rails each independently include one or more wood-plastic composite sheets.

The present invention provides a storm water pretreatment chamber. The storm water pretreatment chamber includes:

a filter sidewall, wherein the filter sidewall include one or more plastic coated woven fiberglass screens, one or more rubber coated woven fiberglass screens, or one or more plastic and rubber coated woven fiberglass screens in an anodized aluminum frame;

three water-impermeable sidewalls connected to the filter sidewall, wherein the three water-impermeable sidewalls each independently include one or more wood-plastic composite sheets;

wherein the filter sidewall and three water-impermeable sidewalls form a debris and sediment trap, wherein the filter sidewall is in communication with the atmosphere and in position to release treated storm water from the debris and sediment trap into a storm water receiving feature;

a chamber grate having a first surface and a second surface, wherein the second surface of the chamber grate is on or connected with the filter sidewall or the filter sidewall and the three water-impermeable sidewalls, wherein the chamber grate is in communication with the atmosphere and in position to receive untreated storm water and to collect one or more floating debris that does not pass through the chamber grate;

three catch rails each independently connected to the filter sidewall or the three water-impermeable sidewalls to form an open top in the storm water pretreatment chamber, wherein the three catch rails are configured to provide an opening into the storm water pretreatment chamber opposite from the storm water receiving feature, wherein the three catch rails each independently catch the one or more floating debris, wherein the three catch rails are positioned above the level of a storm water conveyance;

wherein the open top in the storm water pretreatment chamber is positioned below the level of the storm water conveyance; and four piers supporting the three water-impermeable sidewalls, the filter sidewall, the chamber grate, and the three catch rails, or a combination thereof, wherein the storm water pretreatment chamber has an opening between the filter sidewall, the three catch rails, and the chamber grate that enables storm water to flow out of the debris and sediment trap and into the storm water receiving feature when the filter sidewall is clogged.

In one embodiment, the storm water pretreatment chamber further includes a base having a first surface and a second surface, wherein the first surface is connected to the ground adjacent the storm water receiving feature, wherein the second surface contacts the filter sidewall and the three water-impermeable sidewalls.

The present invention provides a storm water pretreatment chamber. The storm water pretreatment chamber includes:

two filter sidewalls, wherein the two filter sidewalls each independently include one or more plastic coated woven fiberglass screens, one or more rubber coated woven fiberglass screens, or one or more plastic and rubber coated woven fiberglass screens in an anodized aluminum frame;

two water-impermeable sidewalls connected to the filter sidewall, wherein the two water-impermeable sidewalls each independently include one or more wood-plastic composite sheets;

wherein the two filter sidewalls and two water-impermeable sidewalls form a debris and sediment trap, wherein the two filter sidewalls are in independent communication with the atmosphere and in position to release treated storm water from the debris and sediment trap into one or two storm water receiving features;

a chamber grate having a first surface and a second surface, wherein the second surface of the chamber grate is on or connected with the two filter sidewalls and the two water-impermeable sidewalls, wherein the chamber grate is in communication with the atmosphere and in position to receive untreated storm water and to collect one or more floating debris that does not pass through the chamber grate;

two catch rails connected to the two filter sidewalls and the two water-impermeable sidewalls to form an open top in the storm water pretreatment chamber, wherein the two catch rails are configured to provide an opening into the storm water pretreatment chamber perpendicular to the one or more storm water receiving features, wherein the two catch rails each independently catch the one or more floating debris, wherein the two catch rails are positioned above the level of two opposite storm water conveyances;

wherein the open top in the storm water pretreatment chamber is positioned below the level of the two opposite storm water conveyances; and four piers supporting the two water-impermeable sidewalls, the two filter sidewalls, a chamber grate, two catch rails, or a combination thereof, wherein the storm water pretreatment chamber has an opening between the two filter sidewalls, the two catch rails, and the chamber grate that enables storm water to flow out of the debris and sediment trap and into the one or more storm water receiving features when the one or more filter sidewalls are clogged, provided that when two storm water receiving features are present, they are located on opposite sides of the storm water pretreatment chamber.

In one embodiment, the storm water pretreatment chamber further includes base having a first surface and a second surface, wherein the first surface is connected to the ground adjacent the one or two storm water receiving features, wherein the second surface contacts the two filter sidewalls and the two water-impermeable sidewalls.

The present invention provides a storm water pretreatment chamber. The storm water pretreatment chamber includes:

a filter sidewall, wherein the filter sidewall includes one or more plastic coated woven fiberglass screens, one or more rubber coated woven fiberglass screens, or one or more plastic and rubber coated woven fiberglass screens in an anodized aluminum frame;

two water-impermeable sidewalls connected to the filter sidewall, wherein the two water-impermeable sidewalls each independently include one or more wood-plastic composite sheets;

wherein the filter sidewall and two water-impermeable sidewalls form a debris and sediment trap, wherein the filter sidewall is in communication with the atmosphere and in position to release treated storm water from the debris and sediment trap into a storm water receiving feature;

a chamber grate having a first surface and a second surface, wherein the second surface of the chamber grate is on or connected with the filter sidewall and the two water-impermeable sidewalls, wherein the chamber grate is in communication with the atmosphere and in position to receive untreated storm water and to collect one or more floating debris that does not pass through the chamber grate;

two catch rails connected to the filter sidewall and the two water-impermeable sidewalls to form an open top in the storm water pretreatment chamber, wherein the two catch rails are configured to provide an opening into the storm water pretreatment chamber between greater than about zero degrees and less than about ninety degrees to the one or more storm water receiving features, wherein the two catch rails each independently catch the one or more floating debris, wherein the two catch rails are positioned above the level of the storm water conveyance;

wherein the open top in the storm water pretreatment chamber is positioned below the level of the opposite storm water conveyance; and three piers supporting the two water-impermeable sidewalls, the filter sidewall, a chamber grate, and two catch rails, or a combination thereof, wherein the storm water pretreatment chamber has an opening between the filter sidewall, one of the two catch rails, and the chamber grate that enables storm water to flow out of the debris and sediment trap and into the storm water receiving feature when the filter sidewall is clogged.

The present invention provides a storm water pretreatment chamber. The storm water pretreatment chamber includes: base having a first surface and a second surface, wherein the first surface is connected to the ground adjacent the storm water receiving feature, wherein the second surface contacts the filter sidewall and the two water-impermeable sidewalls.

The present invention provides a storm water pretreatment chamber. The storm water pretreatment chamber includes:

two filter sidewalls, wherein the two filter sidewalls each independently include one or more plastic coated woven fiberglass screens, one or more rubber coated woven fiberglass screens, or one or more plastic and rubber coated woven fiberglass screens in an anodized aluminum frame;

a water-impermeable sidewall connected to the each of the two filter sidewalls, wherein the water-impermeable sidewall includes one or more wood-plastic composite sheets;

wherein the two filter sidewalls and the water-impermeable sidewall form a debris and sediment trap, wherein the two filter sidewall are in independent communication with the atmosphere and in position to release treated storm water from the debris and sediment trap into two storm water receiving features;

a chamber grate having a first surface and a second surface, wherein the second surface of the chamber grate is on or connected with the two filter sidewalls and the water-impermeable sidewall, wherein the chamber grate is in communication with the atmosphere and in position to receive untreated storm water and to collect one or more floating debris that does not pass through the chamber grate;

two catch rails connected to the two filter sidewalls and the water-impermeable sidewall to form an open top in the storm water pretreatment chamber, wherein the two catch rails are configured to provide an opening into the storm water pretreatment chamber between greater than about zero degrees and less than about ninety degrees to both of the two storm water receiving features, wherein the two catch rails each independently catch the one or more floating debris, wherein the two catch rails are positioned above the level of the storm water conveyance;

wherein the open top in the storm water pretreatment chamber is positioned below the level of the storm water conveyance; and three piers supporting the water-impermeable sidewall, the two filter sidewalls, the chamber grate, two catch rails, or a combination thereof, wherein the storm water pretreatment chamber has an opening between the two filter sidewalls, one or both of the two catch rails, and the chamber grate that enables storm water to flow out of the debris and sediment trap and into one or both of the storm water receiving features when one or both filter sidewalls are clogged.

In one embodiment, the storm water pretreatment chamber further includes base having a first surface and a second surface, wherein the first surface is connected to the ground adjacent the two storm water receiving features, wherein the second surface contacts the two filter sidewalls and the one water-impermeable sidewall.

The present invention provides a storm water pretreatment chamber. The storm water pretreatment chamber includes:

a circular or oblong filter sidewall, wherein the circular or oblong filter sidewall include one or more plastic coated woven fiberglass screens, one or more rubber coated woven fiberglass screens, or one or more plastic and rubber coated woven fiberglass screens in an anodized aluminum frame and one or more wood-plastic composite sheets;

wherein the circular or oblong filter sidewall forms a debris and sediment trap, wherein the circular or oblong sidewall is in communication with the atmosphere and in position to release treated storm water from the debris and sediment trap into a storm water receiving feature;

a chamber grate having a first surface and a second surface, wherein the second surface of the chamber grate is on or connected with the circular or oblong filter sidewall, wherein the chamber grate is in communication with the atmosphere and in position to receive untreated storm water and to collect one or more floating debris that does not pass through the chamber grate;

a catch rail connected to the circular or oblong filter sidewall to form an open top in the storm water pretreatment chamber, wherein the catch rail is configured to provide an opening into the storm water pretreatment chamber opposite the storm water receiving feature, wherein the catch rail traps the one or more floating debris, wherein the catch rail is positioned above the level of the storm water conveyance;

wherein the open top in the storm water pretreatment chamber is positioned below the level of the storm water conveyance; and three or four piers supporting the circular or oblong filter sidewall, the chamber grate, the catch rail, or a combination thereof, wherein the storm water pretreatment chamber has an opening between the filter sidewall, the catch rail, and the chamber grate that enables storm water to flow out of the debris and sediment trap and into the storm water receiving feature when the filter sidewall is clogged.

In one embodiment, the storm water pretreatment chamber further includes a base having a first surface and a second surface, wherein the first surface is connected to the ground adjacent the storm water receiving feature, wherein the second surface contacts the circular or oblong filter sidewall.

The present invention provides a method of treating storm water. The method includes:

passing storm water through a storm water pretreatment chamber, wherein the storm water pretreatment chamber includes:

one or more filter sidewalls;

one or more optional water-impermeable sidewalls each independently connected to the one or more filter sidewalls;

wherein the one or more filter sidewalls and the one or more optional water-impermeable sidewalls form a debris and sediment trap, wherein the one or more filter sidewalls are each in communication with the atmosphere and in position to release treated storm water from the debris and sediment trap into one or more storm water receiving features;

one or more optional chamber grates each having a first surface and a second surface, wherein each second surface of the one or more optional chamber grates is on or connected with the one or more filter sidewalls or the one or more filter sidewalls and the one or more optional water-impermeable sidewalls, wherein the one or more optional chamber grates are in communication with the atmosphere and in position to receive untreated storm water and to collect one or more floating debris that does not pass through the one or more optional chamber grates; and one or more catch rails each independently connected to the one or more filter sidewalls or the one or more optional water-impermeable sidewalls to form an open top in the storm water pretreatment chamber, wherein the one or more catch rails are configured to provide one or more openings directed away from the one or more storm water receiving features, wherein the one or more catch rails each independently catch the one or more floating debris, wherein the one or more catch rails are positioned above a level of one or more storm water conveyances;

wherein the open top in the storm water pretreatment chamber is positioned below the level of the one or more storm water conveyances, wherein the storm water pretreatment chamber has an opening between the one or more filter sidewalls, the one or more catch rails, and the one or more optional chamber grates that enables storm water to flow out of the debris and sediment trap and into the one or more storm water receiving features when the one or more filter sidewalls is clogged; and separating the floating debris and the sediment.

The present invention provides a method of treating storm water. The method includes:

passing storm water through a storm water pretreatment chamber, wherein the storm water pretreatment chamber includes:

a filter sidewall;

three water-impermeable sidewalls each independently connected to the filter sidewall;

wherein the filter sidewall and three water-impermeable sidewalls form a debris and sediment trap, wherein the filter sidewall is in communication with the atmosphere and in position to release treated storm water from the debris and sediment trap into a storm water receiving feature;

a chamber grate having a first surface and a second surface, wherein the second surface of the chamber grate is on or connected with the filter sidewall or the filter sidewall and the three water-impermeable sidewalls, wherein the chamber grate is in communication with the atmosphere and in position to receive untreated storm water and to collect one or more floating debris that does not pass through the chamber grate; and three catch rails each independently connected to the filter sidewall or the three water-impermeable sidewalls to form an open top in the storm water pretreatment chamber, wherein the three catch rails are configured to provide an opening into the storm water pretreatment chamber opposite from the storm water receiving feature, wherein the three catch rails each independently catch the one or more floating debris, wherein the three catch rails are positioned above the level of a storm water conveyance;

wherein the open top in the storm water pretreatment chamber is positioned below the level of the storm water conveyance, wherein the storm water pretreatment chamber has an opening between the filter sidewall, the three catch rails, and the chamber grate that enables storm water to flow out of the debris and sediment trap and into the storm water receiving feature when the filter sidewall is clogged; and separating the floating debris and the sediment.

The present invention provides a method of treating storm water. The method includes:

passing storm water through a storm water pretreatment chamber, wherein the storm water pretreatment chamber includes:

a filter sidewall, wherein the filter sidewall include one or more plastic coated woven fiberglass screens, one or more rubber coated woven fiberglass screens, or one or more plastic and rubber coated woven fiberglass screens in an anodized aluminum frame;

three water-impermeable sidewalls connected to the filter sidewall, wherein the three water-impermeable sidewalls each independently include one or more wood-plastic composite sheets;

wherein the filter sidewall and three water-impermeable sidewalls form a debris and sediment trap, wherein the filter sidewall is in communication with the atmosphere and in position to release treated storm water from the debris and sediment trap into a storm water receiving feature;

a chamber grate having a first surface and a second surface, wherein the second surface of the chamber grate is on or connected with the filter sidewall or the filter sidewall and the three water-impermeable sidewalls, wherein the chamber grate is in communication with the atmosphere and in position to receive untreated storm water and to collect one or more floating debris that does not pass through the chamber grate;

three catch rails each independently connected to the filter sidewall or the three water-impermeable sidewalls to form an open top in the storm water pretreatment chamber, wherein the three catch rails are configured to provide an opening into the storm water pretreatment chamber opposite from the storm water receiving feature, wherein the three catch rails each independently catch the one or more floating debris, wherein the three catch rails are positioned above the level of a storm water conveyance;

wherein the open top in the storm water pretreatment chamber is positioned below the level of the storm water conveyance; and four piers supporting the three water-impermeable sidewalls, the filter sidewall, a chamber grate, and three catch rails, or a combination thereof, wherein the storm water pretreatment chamber has an opening between the filter sidewall, the three catch rails, and the chamber grate that enables storm water to flow out of the debris and sediment trap and into the storm water receiving feature when the filter sidewall is clogged; and separating the floating debris and the sediment.

BRIEF DESCRIPTION OF THE DRAWINGS

Embodiments of the invention may be best understood by referring to the following description and accompanying drawings, which illustrate such embodiments. In the drawings.

Figure 1:
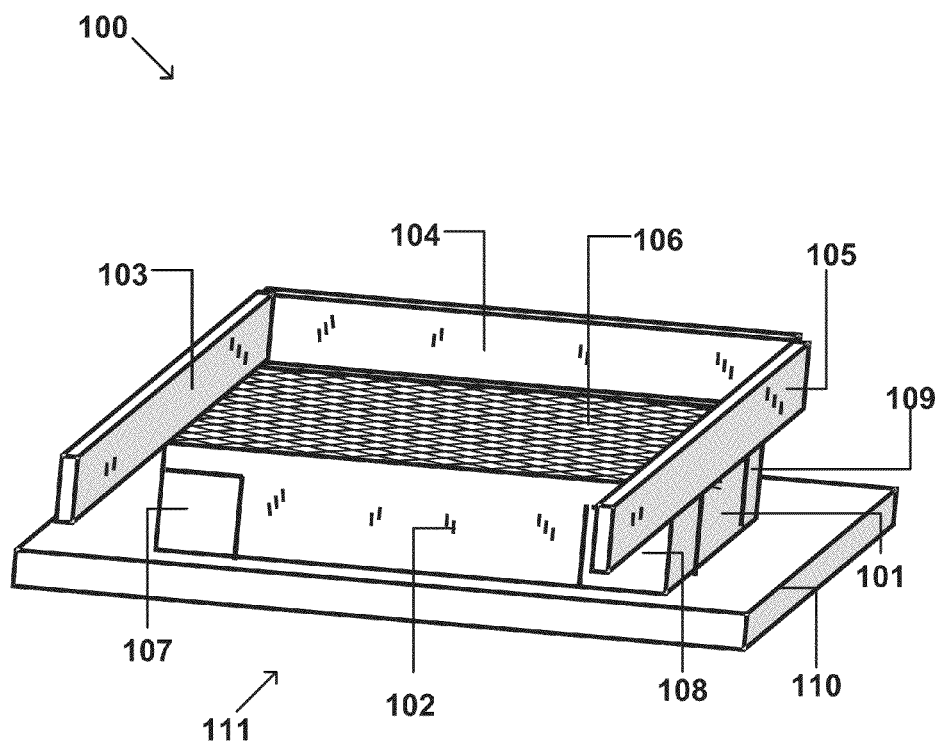
FIG. 1 is a perspective front-side drawing illustrating an exemplary storm water pretreatment chamber.

The drawings are not necessarily to scale. Like numbers used in the figures refer to like components, steps, and the like. However, it will be understood that the use of a number to refer to a component in a given figure is not intended to limit the component in another figure labeled with the same number.

DETAILED DESCRIPTION OF THE INVENTION

The present invention provides a storm water pretreatment chamber for storm water receiving features such as rain gardens. The storm water pretreatment chamber installs easily, simplifies routine maintenance, maximizes functional capacity, and extends the life of the storm water receiving features. The storm water pretreatment chamber is easy to construct, functional, and affordable. The storm water pretreatment chamber eliminates premature rain garden bypass of the untreated storm water due to sediment and debris accumulation. The storm water pretreatment chamber captures both large debris and fine particles. Additionally, the storm water pretreatment chamber contains an overflow feature that ensures treatment of the storm water in spite of neglected maintenance. The storm water pretreatment chamber includes a filter that can be easily removed and swept or rinsed clean with a garden hose. Further, sediment, leaves, and grass clippings, which are trapped inside the storm water pretreatment chamber, are easily removed with, for example, a shovel. The storm water pretreatment chamber is also easily and quickly installed into new or existing storm water receiving features.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events, which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, *Webster's Third New International Dictionary*, Merriam-Webster Inc., Springfield, Mass., 1993 and *The American Heritage Dictionary of the English Language*, Houghton Mifflin, Boston Mass., 1981.

The following explanations of certain terms are meant to be illustrative rather than exhaustive. These terms have their ordinary meanings given by usage in the art and in addition include the following explanations.

As used herein, the term "about" refers to a variation of 10 percent of the value specified; for example about 50 percent carries a variation from 45 to 55 percent.

As used herein, the term "and/or" refers to any one of the items, any combination of the items, or all of the items with which this term is associated.

As used herein, the singular forms "a," "an," and "the" include plural reference unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the phrase "area drain" refers to a drain system collects surface water into one or more small inlet boxes and into a storm water receiving feature.

As used herein, the phrase "French drain" refers to a ditch filled with gravel or rock that redirects surface and ground water away from an area and into a storm water receiving feature.

As used herein, the phrase "curb inlet" refers to a location where storm water runoff from the street into the storm water receiving feature.

As used herein, the phrase "drop inlet" refers to a location where storm water runoff from an open area can enter a drain leading into a storm water receiving feature.

As used herein, the phrase "curb-cut" refers to a curb with the curb wall either removed or lowered so that storm water may exit it.

As used herein, the term "flume" refers to an open artificial channel or chute carrying a stream of water into a storm water receiving feature.

As used herein, the term "swale" refers to a depression between slopes that carries drainage into a storm water receiving feature.

As used herein, the terms "include," "for example," "such as," and the like are used illustratively and are not intended to limit the present invention.

As used herein, the terms "front," "back," "rear," "upper," "lower," "right," and "left" in this description are merely used to identify the various elements as they are oriented in the FIGS, with "front," "back," and "rear" being relative apparatus. These terms are not meant to limit the element, which they describe, as the various elements may be oriented differently in various applications.

As used herein, the phrase "storm water conveyance" refers to any device, natural or man-made, that conducts storm water into the storm water pretreatment chamber. Typically, a storm water conveyance is a curb-cut, a curb inlet, a drop inlet, a ramp, a pipe, a flume, a swale, a French drain, an area drain, a private drain, and the like that allows storm water to run from a street, down spout, sidewalk, parking lot, and the like, or combinations thereof, into the storm water pretreatment chamber.

As used herein, the phrase "storm water receiving feature" refers to a feature that is designated to receive storm water. Typically, storm water receiving features include, for example, rain gardens, tree boxes, infiltration trenches, wet and dry ponds, infiltration benches, vegetated swales, and the like, or combinations thereof.

As used herein, the phrase "storm water" refers to untreated water runoff from land and impervious areas, for example, paved streets, parking lots, building rooftops, and the like during rainfall and snow events. As used herein, the phrase "storm water" may also refer untreated water runoff from urban or industrial source, for example irrigation, wash water, air conditioning condensate, and the like.

FIG. 1 is a perspective front-side drawing illustrating an exemplary storm water pretreatment chamber 100. The storm water pretreatment chamber 100 includes a first water-impermeable sidewall 101, a second water-impermeable sidewall 102, a third water-impermeable sidewall (not shown), a filter sidewall (not shown), a first catch rail 103, a second catch rail 104, a third catch rail 105, a chamber grate 106, a first pier 107, a second pier 108, a third pier 109, a fourth pier (not shown), and a base 110.

In one embodiment, the first pier 107, the second pier 108, the third pier 109, and the fourth pier (not shown) rest upon the base 110. The first water-impermeable sidewall 101 is connected to the second pier 108 and the third pier 109. The second water-impermeable sidewall 102 is connected to the first pier 107 and the second pier 108. The third water-impermeable sidewall (not shown) is connected to the first pier 107 and the fourth pier (not shown). The filter sidewall (not shown) is connected to the third pier 109 and the fourth pier (not shown). Water-proof caulking is applied to all of the edges within the storm water pretreatment chamber 100 to prevent water from leaving the storm water pretreatment chamber 100 except through the filter sidewall (not shown) or through the opening (not shown) between the filter sidewall (not shown), the second catch rail 104, and the chamber grate 106.

In one embodiment, the chamber grate 106 rests upon or is connected to the first pier 107, the second pier 108, the third pier 109, and the fourth pier (not shown). In one embodiment, the chamber grate 106 also rests upon the first water-impermeable sidewall 101, the second water-impermeable sidewall 102, the third water-impermeable sidewall (not shown), and the filter sidewall (not shown). In one embodiment, the chamber grate 106 is connected to one or more of the piers, one or more of the water-impermeable sidewalls, the one or more piers, or the combination thereof by one or more hinges (not shown).

In one embodiment, the first catch rail 103 is connected to the third water-impermeable sidewall (not shown), the first pier 107, the fourth pier (not shown), or a combination thereof. In one embodiment, the second catch rail 104 is connected to the fourth pier (not shown), the filter sidewall (not shown), the third pier 109, or a combination thereof. In one embodiment, the third catch rail 105 is connected to the second pier 108, the water-impermeable sidewall 101, the third pier 109, or a combination thereof. The storm water conveyance opening 111, formed by the first catch rail 103, the second catch rail 104, and the third catch rail 105 is positioned to receive storm water from a storm water conveyance, typically a street. In one embodiment, the storm water conveyance opening 111 is in a direction opposite the storm water receiving feature (not shown), which is adjacent to the filter sidewall (not shown).

Typical storm water receiving features include, for example, rain gardens, tree boxes, infiltration trenches, wet and dry ponds, infiltration benches, vegetated swales, and the like, or combinations thereof.

The dimensions of the base 110, the distance of the storm water pretreatment chamber 100 from the curb, and the elevation of the storm water pretreatment chamber 100 vary with site conditions. The top of the chamber grate 106 may be about 1 inch to about 2 inches below the level of the street gutter. Further, the base 110 may extend beyond the filter sidewall (not shown) to serve as a splash dissipater.

Figure 2:
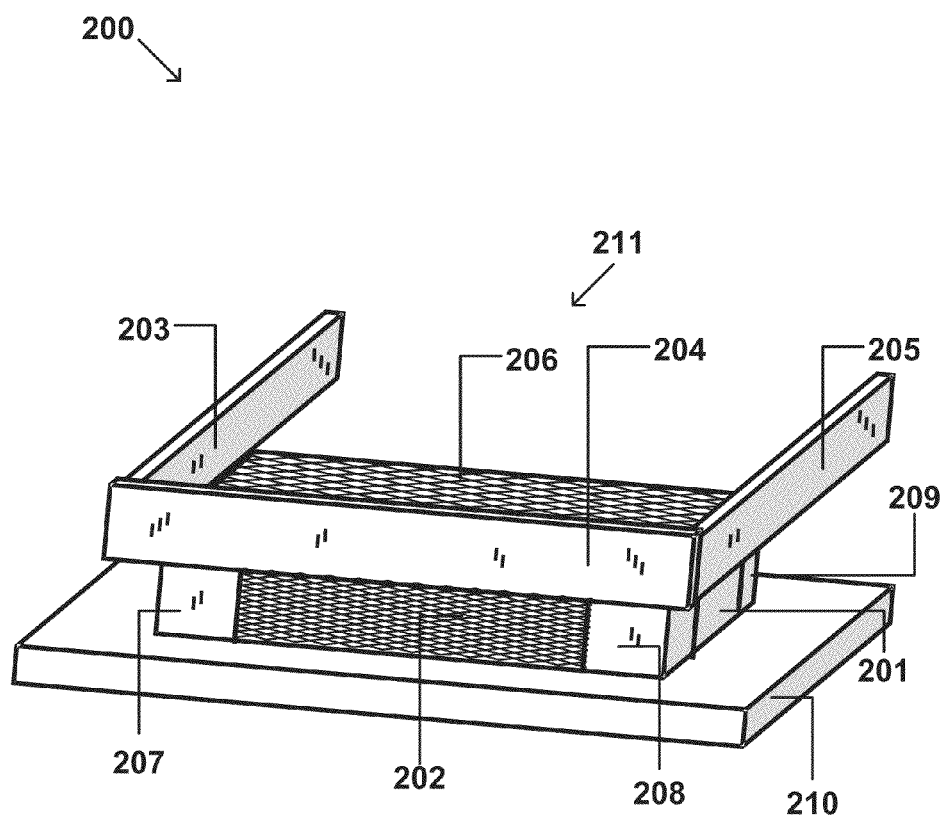
FIG. 2 is a perspective back-side drawing illustrating an exemplary storm water pretreatment chamber.

FIG. 2 is a perspective back-side drawing illustrating an exemplary storm water pretreatment chamber 200. The storm water pretreatment chamber 200 includes a first water-impermeable sidewall 201, a second water-impermeable sidewall (not shown), a third water-impermeable sidewall (not shown), a filter sidewall 202, a first catch rail 203, a second catch rail 204, a third catch rail 205, a chamber grate 206, a first pier 207, a second pier 208, a third pier 209, a fourth pier (not shown), and a base 210.

In one embodiment, the first pier 207, the second pier 208, the third pier 209, and the fourth pier (not shown) rest upon the base 210. The first water-impermeable sidewall 201 is connected to the second pier 208 and the third pier 209. The second water-impermeable sidewall (not shown) is connected to the first pier 207 and the fourth pier (not shown). The third water-impermeable sidewall (not shown) is connected to the third pier 209 and the fourth pier (not shown). The filter sidewall 202 is connected to the first pier 207 and the second pier 208. Water-proof caulking is applied to all of the edges within the storm water pretreatment chamber 200 to prevent water from leaving the storm water pretreatment chamber 200 except through the filter sidewall 202 or through the opening (not shown) between the filter sidewall 202, the second catch rail 204, and the chamber grate 206.

In one embodiment, the chamber grate 206 rests upon or is connected to the first pier 207, the second pier 208, the third pier 209, and the fourth pier (not shown). In one embodiment, the chamber grate 206 also rests upon the first water-impermeable sidewall 201, the second water-impermeable sidewall (not shown), the third water-impermeable sidewall (not shown), and the filter sidewall 202. In one embodiment, the chamber grate 206 is connected to one or more of the piers, one or more of the water-impermeable sidewalls, the one or more piers, or the combination thereof by one or more hinges (not shown).

In one embodiment, the first catch rail 203 is connected to the second water-impermeable sidewall (not shown), the first pier 207, the fourth pier (not shown), or a combination thereof. In one embodiment, the second catch rail 204 is connected to the first pier 207, the filter sidewall 202, the second pier 208, or a combination thereof. In one embodiment, the third catch rail 205 is connected to the second pier 208, the water-impermeable sidewall 201, the third pier 209, or a combination thereof. The storm water conveyance opening 211, formed by the first catch rail 203, the second catch rail 204, and the third catch rail 205 is positioned to receive storm water from a storm water conveyance, typically a street. In one embodiment, the storm water conveyance opening 211 is in a direction opposite the storm water receiving feature (not shown), which is adjacent to the filter sidewall 202.

The dimensions of the base 210, the distance of the storm water pretreatment chamber 200 from the curb, and the elevation of the storm water pretreatment chamber 200 vary with site conditions. The top of the chamber grate 206 may be about 1 inch to about 2 inches below the level of the street gutter. Further, the base 210 may extend beyond the filter sidewall 202 to serve as a splash dissipater.

Figure 3:
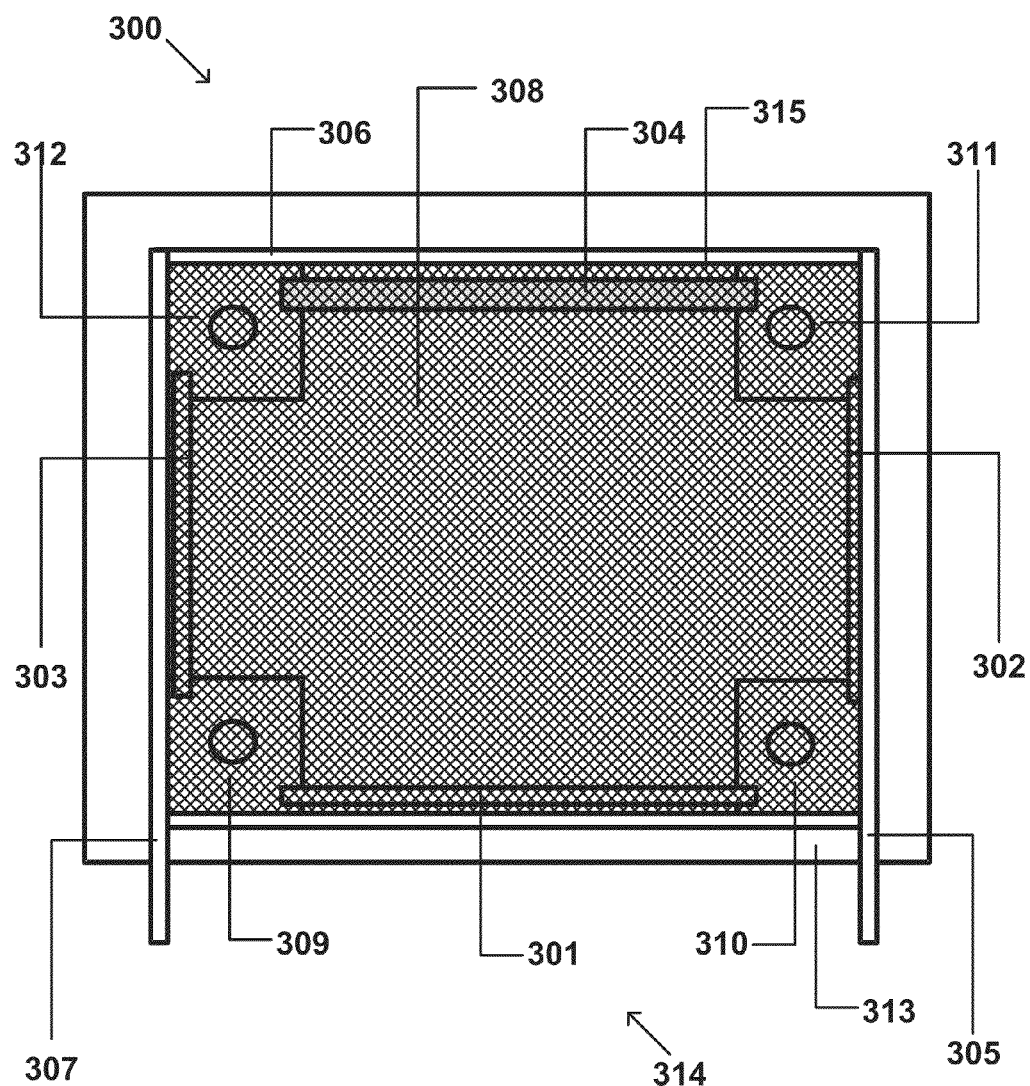
FIG. 3 is a top-view drawing illustrating an exemplary storm water pretreatment chamber.

FIG. 3 is a top-view drawing illustrating an exemplary storm water pretreatment chamber 300. The storm water pretreatment chamber 300 includes a first water-impermeable sidewall 301, a second water-impermeable sidewall 302, a third water-impermeable sidewall 303, a filter sidewall 304, a first catch rail 305, a second catch rail 306, a third catch rail 307, a chamber grate 308, a first pier 309, a second pier 310, a third pier 311, a fourth pier 312, and a base 313.

In one embodiment, the first pier 309, the second pier 310, the third pier 311, and the fourth pier 312 rest upon the base 313. The first water-impermeable sidewall 301 is connected to the first pier 309 and the second pier 310. The second water-impermeable sidewall 302 is connected to the second pier 310 and the third pier 311. The third water-impermeable sidewall 303 is connected to the first pier 309 and the fourth pier 312. The filter sidewall 304 is connected to the third pier 311 and the fourth pier 312. Water-proof caulking is applied to all of the edges within the storm water pretreatment chamber 300 to prevent water from leaving the storm water pretreatment chamber 300 except through the filter sidewall 304 or through the opening 314 between the filter sidewall 304, the second catch rail 306, and the chamber grate 308.

In one embodiment, the chamber grate 308 rests upon or is connected to the first pier 309, the second pier 310, the third pier 311, and the fourth pier 312. In one embodiment, the chamber grate 308 also rests upon the first water-impermeable sidewall 301, the second water-impermeable sidewall 302, the third water-impermeable sidewall 303, and the filter sidewall 304. In one embodiment, the chamber grate 308 is connected to one or more of the piers, one or more of the water-impermeable sidewalls, the one or more piers, or the combination thereof by one or more hinges (not shown).

In one embodiment, the first catch rail 305 is connected to the second water-impermeable sidewall 302, the second pier 310, the third pier 311, or a combination thereof. In one embodiment, the second catch rail 306 is connected to the third pier 311, the filter sidewall 304, the fourth pier 312, or a combination thereof. In one embodiment, the third catch rail 307 is connected to the first pier 309, the third water-impermeable sidewall 303, the fourth pier 312, or a combination thereof. The storm water conveyance opening 314, formed by the first catch rail 305, the second catch rail 306, and the third catch rail 307 is positioned to receive storm water from a storm water conveyance, typically a street. In one embodiment, the storm water conveyance opening 314 is in a direction opposite the storm water receiving feature (not shown), which is adjacent to the filter sidewall 304.

In one embodiment, a space 315 is present between the filter sidewall 304 and the second catch rail 306 so that if the filter sidewall 304 becomes clogged, water can flow upward over the chamber grate 308 and out through the opening 315 to the adjacent storm water receiving feature (not shown).

The dimensions of the base 313, the distance of the storm water pretreatment chamber 300 from the curb, and the elevation of the storm water pretreatment chamber 300 vary with site conditions. The top of the chamber grate 308 may be about 1 inch to about 2 inches below the level of the street gutter. Further, the base 313 may extend beyond the filter sidewall 304 to serve as a splash dissipater.

Figure 4A:
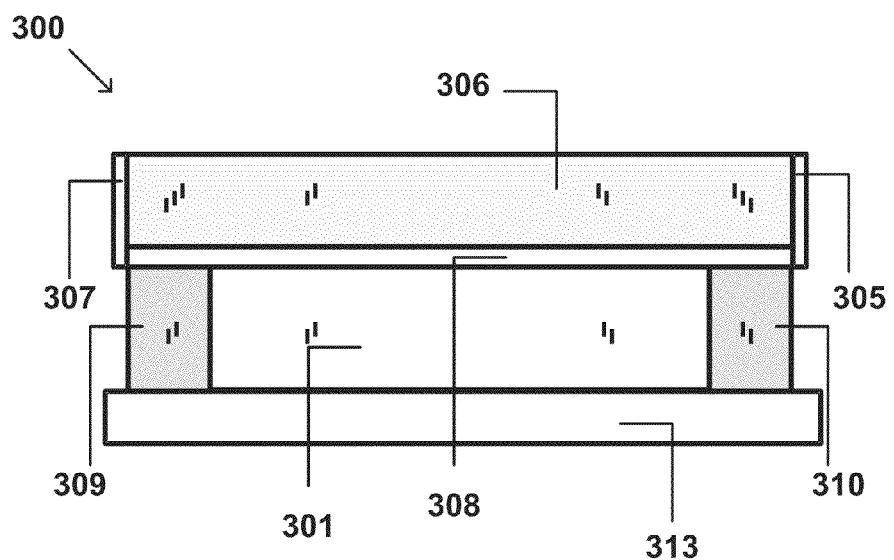
FIGS. 4A-D are various side-view drawings illustrating an exemplary storm water pretreatment chamber.

FIG. 4A is a front-side view drawing illustrating an exemplary storm water pretreatment chamber 300. The storm water pretreatment chamber 300 includes a first water-impermeable sidewall 301, a first catch rail 305, a second catch rail 306, a third catch rail 307, a chamber grate 308, a first pier 309, a second pier 310, and a base 313.

In one embodiment, the first pier 309 and the second pier 310 rest upon the base 313. The first water-impermeable sidewall 301 is connected to the first pier 309 and the second pier 310.

In one embodiment, the chamber grate 308 rests upon or is connected to the first pier 309 and the second pier 310. In one embodiment, the chamber grate 308 also rests upon the first water-impermeable sidewall 301. In one embodiment, the chamber grate 308 is connected to one or more of the piers, one or more of the water-impermeable sidewalls, the one or more piers, or the combination thereof by one or more hinges (not shown).

In one embodiment, the first catch rail 305 is connected to the second water-impermeable sidewall (not shown), the second pier 310, the third pier (not shown), or a combination thereof. In one embodiment, the second catch rail 306 is connected to the third pier (not shown), the filter sidewall (not shown), the fourth pier (not shown), or a combination thereof. In one embodiment, the third catch rail 307 is connected to the first pier 309, the third water-impermeable sidewall (not shown), the fourth pier (not shown), or a combination thereof. The storm water conveyance opening (not shown) formed by the first catch rail 305, the second catch rail 306, and the third catch rail 307 is positioned to receive storm water from a storm water conveyance (not shown), typically a street. In one embodiment, the storm water conveyance opening (not shown) is in a direction opposite the storm water receiving feature (not shown), which is adjacent to the filter sidewall (not shown).

Figure 4B:
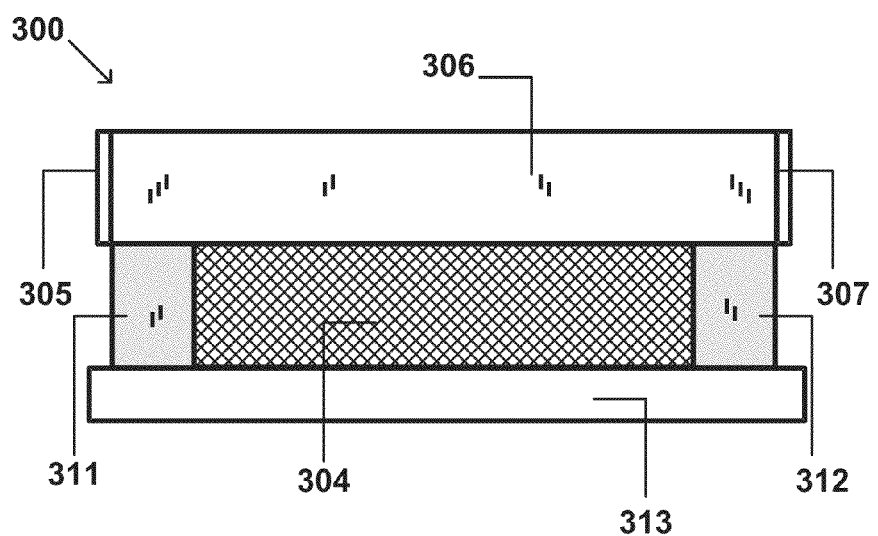

FIG. 4B is a back-side view drawing illustrating an exemplary storm water pretreatment chamber 300. The storm water pretreatment chamber 300 includes a filter sidewall 304, a first catch rail 305, a second catch rail 306, a third catch rail 306, a third pier 311, a fourth pier 312, and a base 313.

In one embodiment, the third pier 311 and the fourth pier 312 rest upon the base 313. The filter sidewall 304 is connected to the third pier 311 and the fourth pier 312.

In one embodiment, the first catch rail 305 is connected to the second water-impermeable sidewall (not shown), the second pier (not shown), the third pier 311, or a combination thereof. In one embodiment, the second catch rail 306 is connected to the third pier 311, the filter sidewall 304, the fourth pier 312, or a combination thereof. In one embodiment, the third catch rail 307 is connected to the first pier (not shown), the third water-impermeable sidewall (not shown), the fourth pier 312, or a combination thereof. The storm water conveyance opening (not shown) formed by the first catch rail 305, the second catch rail 306, and the third catch rail 307 is positioned to receive storm water from a storm water conveyance (not shown), typically a street. In one embodiment, the storm water conveyance opening (not shown) is in a direction opposite the storm water receiving feature (not shown), which is adjacent to the filter sidewall 304.

Figure 4C:

FIG. 4C is a right-side view drawing illustrating an exemplary storm water pretreatment chamber 300. The storm water pretreatment chamber 300 includes a second water-impermeable sidewall 302, a first catch rail 305, a second catch rail 306, a second pier 310, a third pier 311, and a base 313.

In one embodiment, the second pier 310 and the third pier 311 rest upon the base 313. The second water-impermeable sidewall 302 is connected to the second pier 310 and the third pier 311.

In one embodiment, the first catch rail 305 is connected to the second water-impermeable sidewall 302, the second pier 310, the third pier 311, or a combination thereof. In one embodiment, the second catch rail 306 is connected to the third pier 311, the filter sidewall (not shown), the fourth pier (not shown), or a combination thereof. The storm water conveyance opening (not shown) formed by the first catch rail 305, the second catch rail 306, and the third catch rail (not shown), is positioned to receive storm water from a storm water conveyance (not shown), typically a street. In one embodiment, the storm water conveyance opening (not shown) is in a direction opposite the storm water receiving feature (not shown), which is adjacent to the filter sidewall (not shown).

Figure 4D:
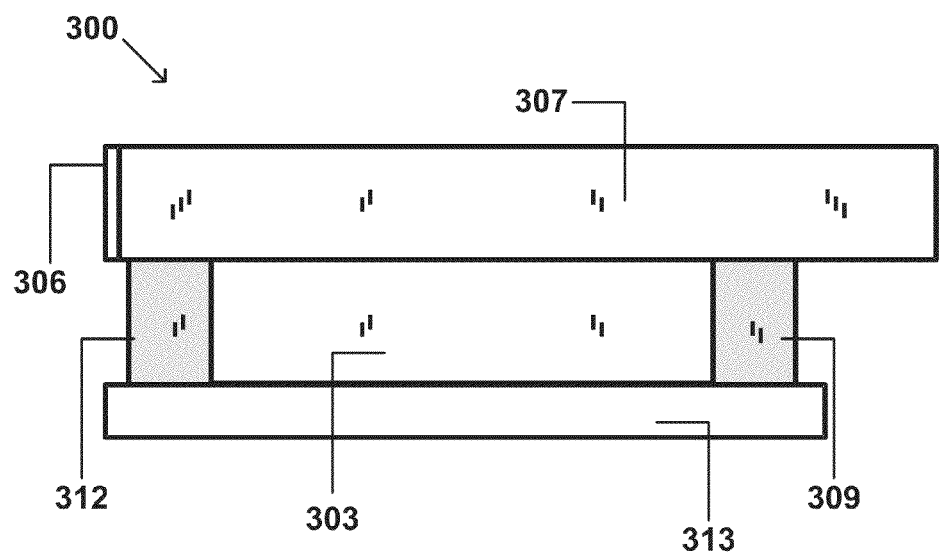

FIG. 4D is a left-side view drawing illustrating an exemplary storm water pretreatment chamber 300. The storm water pretreatment chamber 300 includes a third water-impermeable sidewall 303, a second catch rail 306, a third catch rail 307, a first pier 309, a fourth pier 312, and a base 313.

In one embodiment, the first pier 309 and the fourth pier 312 rest upon the base 313. The third water-impermeable sidewall 303 is connected to the first pier 309 and the fourth pier 312.

In one embodiment, the second catch rail 306 is connected to the third pier (not shown), the filter sidewall (not shown), the fourth pier 312, or a combination thereof. In one embodiment, the third catch rail 307 is connected to the first pier 309, the third water-impermeable sidewall 303, the fourth pier 312, or a combination thereof. The storm water conveyance opening (not shown) formed by the first catch rail (not shown), the second catch rail 306, and the third catch rail 307, is positioned to receive storm water from a storm water conveyance (not shown), typically a street. In one embodiment, the storm water conveyance opening (not shown) is in a direction opposite the storm water receiving feature (not shown), which is adjacent to the filter sidewall (not shown).

Figure 5:
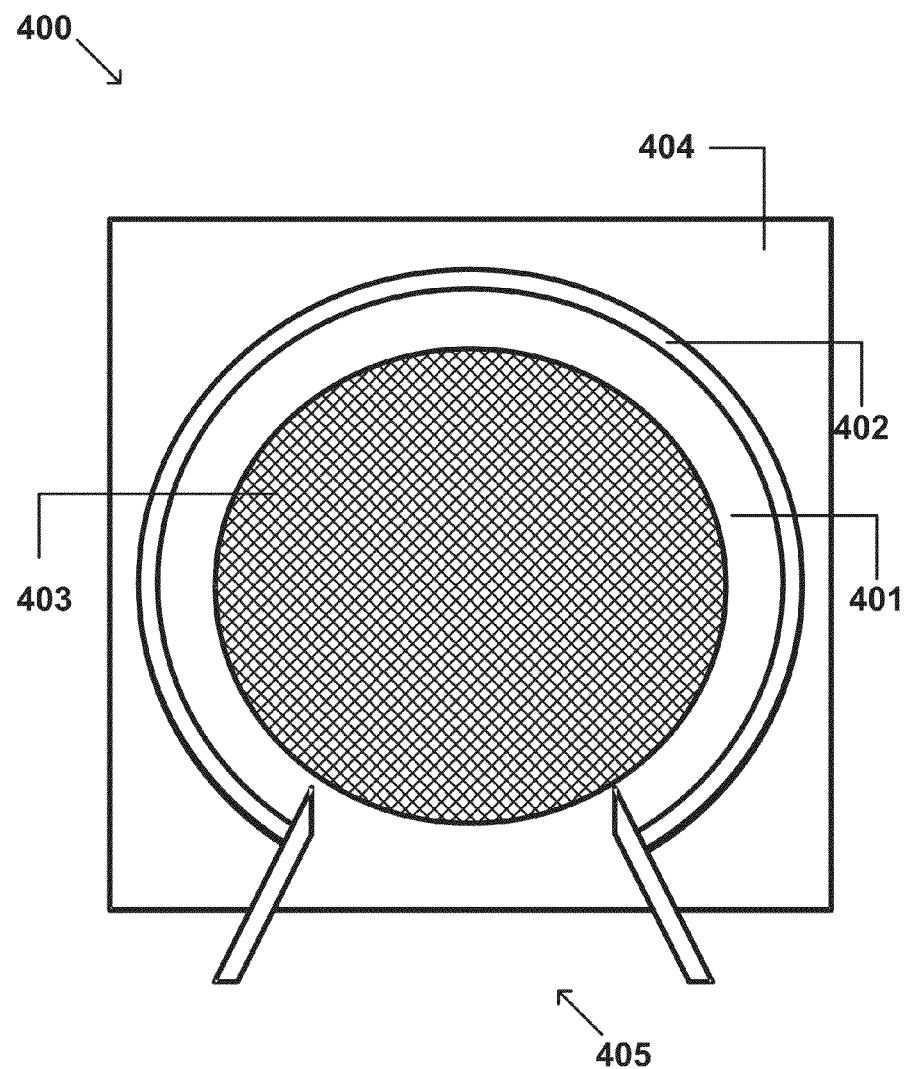
FIG. 5 is a top-view drawing illustrating an exemplary storm water pretreatment chamber.

FIG. 5 is a top-view drawing illustrating an exemplary storm water pretreatment chamber 400. The circular storm water pretreatment chamber 400 includes a filter sidewall 401, a catch rail 402, a chamber grate 403, and a base 404.

In one embodiment, the filter sidewall 401 rests upon the base 404. Water-proof caulking is applied to all of the edges within the storm water pretreatment chamber 400 to prevent water from leaving the storm water pretreatment chamber 400 except through the filter sidewall 401 or through the opening (not shown) between the filter sidewall 401, the catch rail 402, and the chamber grate 403.

In one embodiment, the chamber grate 403 rests upon or is connected to one or more piers (not shown). In one embodiment, the chamber grate 403 rests upon the filter sidewall 401. In one embodiment, the chamber grate 403 is connected to one or more of the piers (not shown) and the filter sidewall 401 or the combination thereof by one or more hinges (not shown).

In one embodiment, the catch rail 402 is connected to the filter sidewall 401. The storm water conveyance opening 405, formed by the catch rail 402 is positioned to receive storm water from a storm water conveyance, typically a street. In one embodiment, the storm water conveyance opening 405 is in a direction opposite the storm water receiving feature (not shown), which is adjacent to the filter sidewall 401.

In one embodiment, a space (not shown) is present between the filter sidewall 401 and the catch rail 402 so that if the filter sidewall 401 becomes clogged, water can flow upward over the chamber grate 403 and out through the space (not shown) to the adjacent storm water receiving feature (not shown).

The dimensions of the base 404, the distance of the storm water pretreatment chamber 400 from the curb, and the elevation of the storm water pretreatment chamber 400 vary with site conditions. The top of the chamber grate 403 may be about 1 inch to about 2 inches below the level of the street gutter. Further, the base 404 may extend beyond the filter sidewall 401 to serve as a splash dissipater.

Figure 6A:
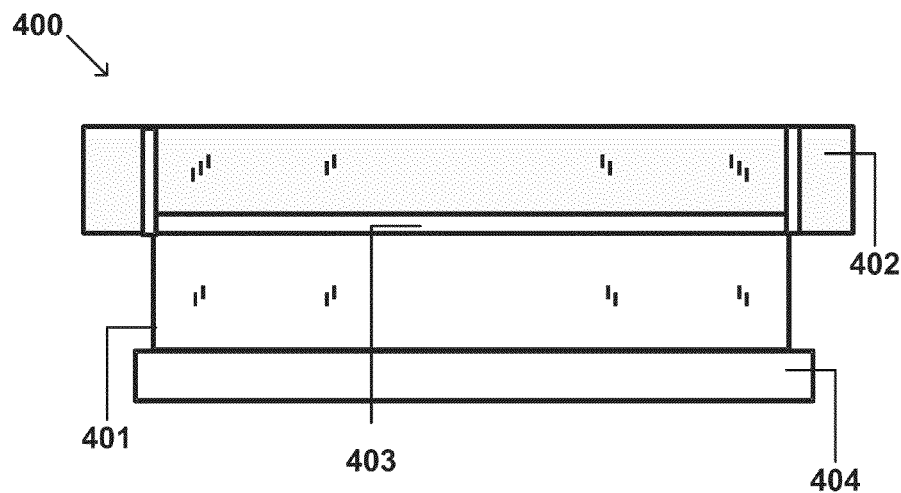
FIGS. 6A-D are various side-view drawings illustrating an exemplary storm water pretreatment chamber.

FIG. 6A is a front-view drawing illustrating an exemplary storm water pretreatment chamber 400. The circular storm water pretreatment chamber 400 includes a filter sidewall 401, a catch rail 402, a chamber grate 403, and a base 404.

In one embodiment, the filter sidewall 401 rests upon the base 404. Water-proof caulking is applied to all of the edges within the storm water pretreatment chamber 400 to prevent water from leaving the storm water pretreatment chamber 400 except through the filter sidewall 401 or through the opening (not shown) between the filter sidewall 401, the catch rail 402, and the chamber grate 403.

In one embodiment, the chamber grate 403 rests upon or is connected to one or more piers (not shown). In one embodiment, the chamber grate 403 rests upon the filter sidewall 401. In one embodiment, the chamber grate 403 is connected to one or more of the piers (not shown) and the filter sidewall 401 or the combination thereof by one or more hinges (not shown).

In one embodiment, the catch rail 402 is connected to the filter sidewall 401. The storm water conveyance opening (not shown), formed by the catch rail 402 is positioned to receive storm water from a storm water conveyance (not shown), typically a street.

Figure 6B:
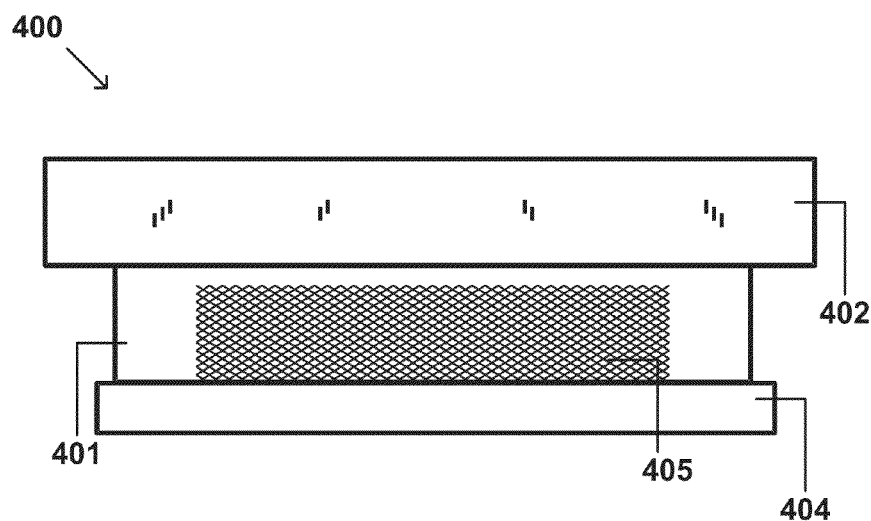

FIG. 6B is a rear-view drawing illustrating an exemplary storm water pretreatment chamber 400. The circular storm water pretreatment chamber 400 includes a filter sidewall 401, a catch rail 402, and a base 404.

In one embodiment, the filter sidewall 401 rests upon the base 404. Water-proof caulking is applied to all of the edges within the storm water pretreatment chamber 400 to prevent water from leaving the storm water pretreatment chamber 400 except through the filter sidewall 401 or through the opening (not shown) between the filter sidewall 401, the catch rail 402, and the chamber grate (not shown).

In one embodiment, the catch rail 402 is connected to the filter sidewall 401. The storm water conveyance opening (not shown), formed by the catch rail 402 is positioned to receive storm water from a storm water conveyance, typically a street. The filter sidewall 401 includes a screen 40 that allows treated storm water to flow out of the storm water pretreatment chamber 400.

Figure 6C:
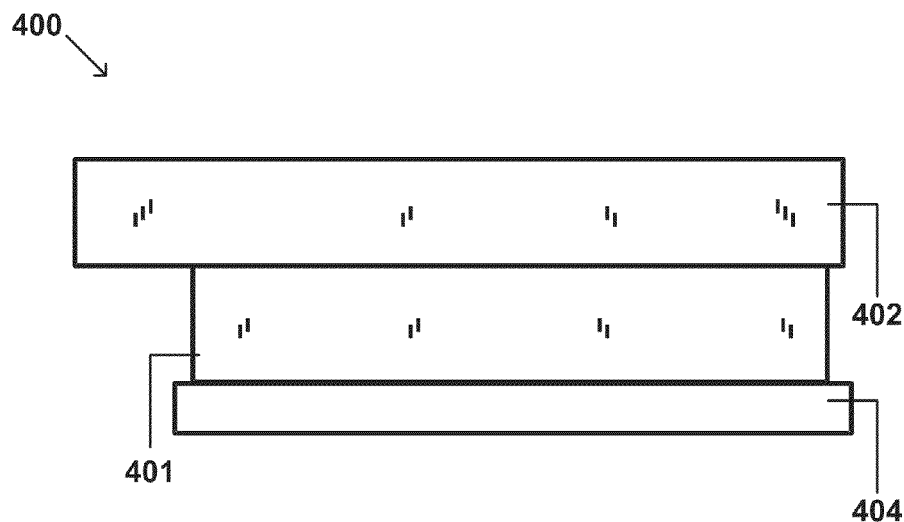

FIG. 6C is a right-side view drawing illustrating an exemplary storm water pretreatment chamber 400. The circular storm water pretreatment chamber 400 includes a filter sidewall 401, a catch rail 402, and a base 404.

In one embodiment, the filter sidewall 401 rests upon the base 404. Water-proof caulking is applied to all of the edges within the storm water pretreatment chamber 400 to prevent water from leaving the storm water pretreatment chamber 400 except through the filter sidewall 401 or through the opening (not shown) between the filter sidewall 401, the catch rail 402, and the chamber grate (not shown).

In one embodiment, the catch rail 402 is connected to the filter sidewall 401. The storm water conveyance opening (not shown), formed by the catch rail 402 is positioned to receive storm water from a storm water conveyance (not shown), typically a street.

Figure 6D:
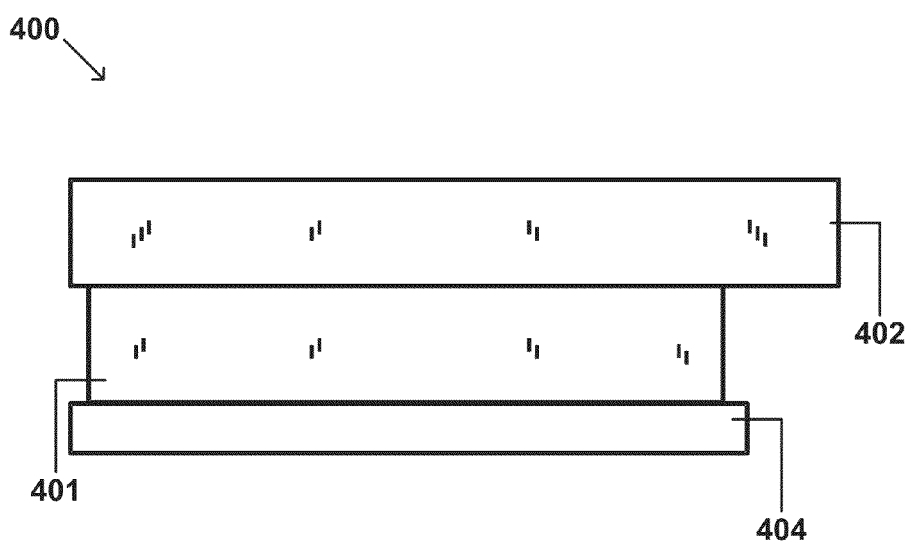

FIG. 6D is a left-side view drawing illustrating an exemplary storm water pretreatment chamber 400. The circular storm water pretreatment chamber 400 includes a filter sidewall 401, a catch rail 402, and a base 404.

In one embodiment, the filter sidewall 401 rests upon the base 404. Water-proof caulking is applied to all of the edges within the storm water pretreatment chamber 400 to prevent water from leaving the storm water pretreatment chamber 400 except through the filter sidewall 401 or through the opening (not shown) between the filter sidewall 401, the catch rail 402, and the chamber grate (not shown).

In one embodiment, the catch rail 402 is connected to the filter sidewall 401. The storm water conveyance opening (not shown), formed by the catch rail 402 is positioned to receive storm water from a storm water conveyance, typically a street.

Figure 7:
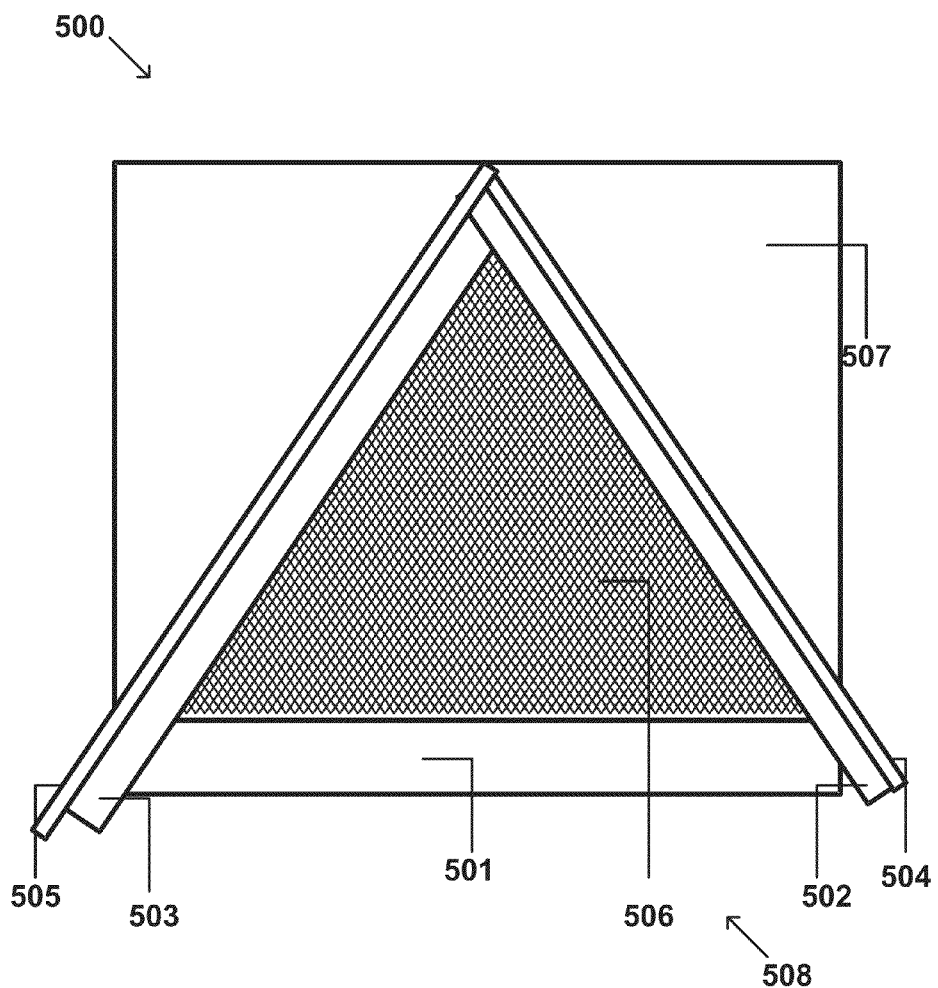
FIG. 7 is a top-view drawing illustrating an exemplary storm water pretreatment chamber.

FIG. 7 is a top-view drawing illustrating an exemplary storm water pretreatment chamber 500. The triangular storm water pretreatment chamber 500 includes a first water-impermeable sidewall 501, a first filter sidewall 502, a second filter sidewall 503, a first catch rail 504, a second catch rail 505, a chamber grate 506, and a base 507.

In one embodiment, the first water-impermeable sidewall 501, the first filter sidewall 502, and the second filter sidewall 503 rest upon the base 507. Water-proof caulking is applied to all of the edges within the storm water pretreatment chamber 500 to prevent water from leaving the storm water pretreatment chamber 500 except through the first filter sidewall 502, the second filter sidewall 503, or a combination thereof or through the opening (not shown) between the first filter sidewall 502, the second filter sidewall 503, the first catch rail 504, the second catch rail 505, and the chamber grate 506.

In one embodiment, the chamber grate 506 rests upon or is connected to one or more piers (not shown). In one embodiment, the chamber grate 506 rests upon the first water-impermeable sidewall 501, the first filter sidewall 502, the second filter sidewall 503, or a combination thereof. In one embodiment, the chamber grate 506 is connected to one or more of the piers (not shown) and the first filter sidewall 502 or the second filter sidewall 503, or the combination thereof by one or more hinges (not shown).

In one embodiment, the first catch rail 504 is connected to the first filter sidewall 502. In one embodiment, the second catch rail 505 is connected to the second filter sidewall 503. The storm water conveyance opening 508, formed by the first catch rail 505 and the second catch rail 506 is positioned to receive storm water from a storm water conveyance, typically a street. In one embodiment, the storm water conveyance opening 508 is in an angle between greater than about twenty degrees and less than about seventy degrees to the storm water receiving features (not shown), which are each adjacent to the first filter sidewall 502 and the second filter sidewall 503.

In one embodiment, one or more spaces (not shown) are present between the first filter sidewall 502 and the first catch rail 504, the second filter sidewall 503 and the second catch rail 505, or a combination thereof, so that if the first filter sidewall 502, the second filter sidewall 503, or the combination thereof becomes clogged, water can flow upward over the chamber grate 506 and out through the one or more spaces (not shown) to the adjacent storm water receiving features (not shown).

The dimensions of the base 507, the distance of the storm water pretreatment chamber 500 from the curb, and the elevation of the storm water pretreatment chamber 500 vary with site conditions. The top of the chamber grate 506 may be about 1 inch to about 2 inches below the level of the street gutter. Further, the base 507 may extend beyond the filter sidewall 503 to serve as a splash dissipater.

Figure 8A:
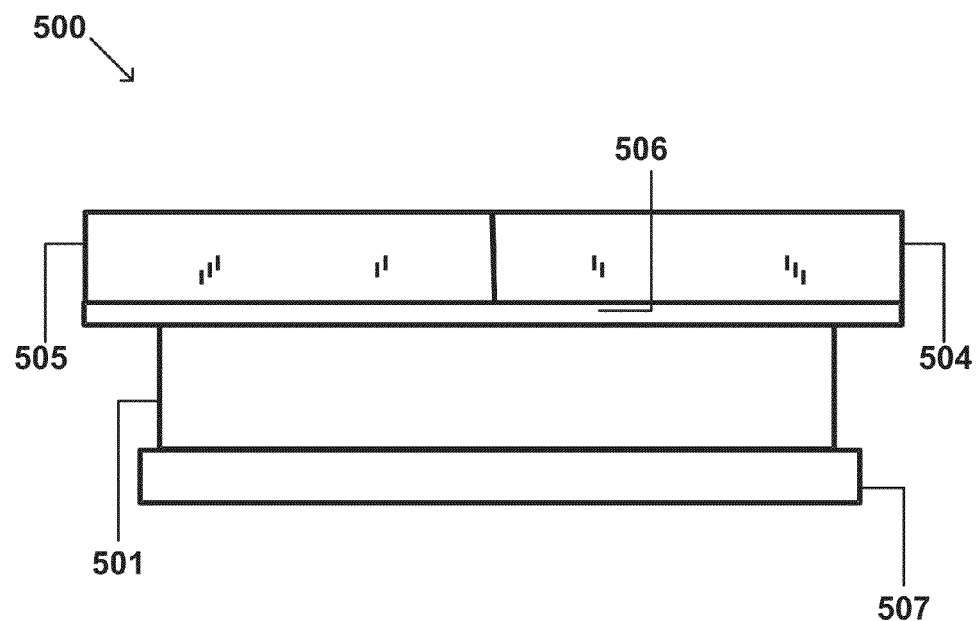
FIGS. 8A-D are various side-view drawings illustrating an exemplary storm water pretreatment chamber.

FIG. 8A is a front-view drawing illustrating an exemplary storm water pretreatment chamber 500. The triangular storm water pretreatment chamber 500 includes a first water-impermeable sidewall 501, a first catch rail 504, a second catch rail 505, a chamber grate 506, and a base 507.

In one embodiment, the first water-impermeable sidewall 501 rests upon the base 507. Water-proof caulking is applied to all of the edges within the storm water pretreatment chamber 500 to prevent water from leaving the storm water pretreatment chamber 500 except through the first filter sidewall (not shown), the second filter sidewall (not shown), or the combination thereof.

In one embodiment, the chamber grate 506 rests upon or is connected to one or more piers (not shown). In one embodiment, the chamber grate 506 rests upon the first water-impermeable sidewall 501, the first filter sidewall (not shown), the second filter sidewall (not shown), or the combination thereof. In one embodiment, the chamber grate 506 is connected to one or more of the piers (not shown), the first water-impermeable sidewall 501, the first filter sidewall (not shown), the second filter sidewall (not shown), or the combination thereof, by one or more hinges (not shown).

In one embodiment, the first catch rail 504 is connected to the first filter sidewall (not shown). In one embodiment, the second catch rail 505 is connected to the second filter sidewall (not shown). The storm water conveyance opening (not shown), formed by the first catch rail 504 and the second catch rail 505 is positioned to receive storm water from a storm water conveyance (not shown), typically a street.

Figure 8B:
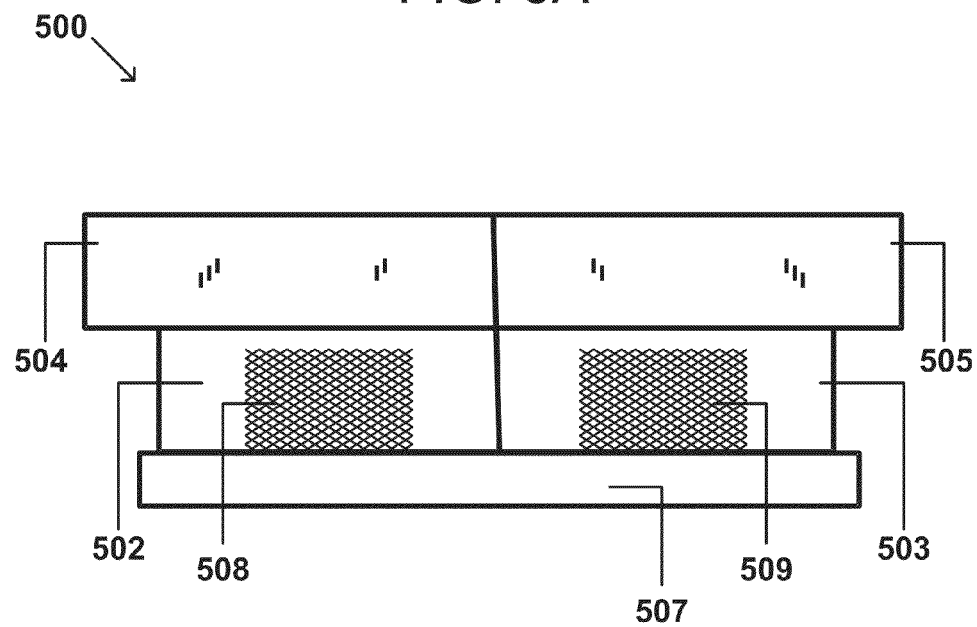

FIG. 8B is a rear-view drawing illustrating an exemplary storm water pretreatment chamber 500. The triangular storm water pretreatment chamber 500 includes a first filter sidewall 502, a second filter sidewall 503, a first catch rail 504, a second catch rail 505, and a base 507. The first filter sidewall 502 includes a first screen 508 that allows treated storm water to flow out of the storm water pretreatment chamber 500. The second filter sidewall 503 includes a second screen 509 that allows treated storm water to flow out of the storm water pretreatment chamber 500.

Figure 8C:
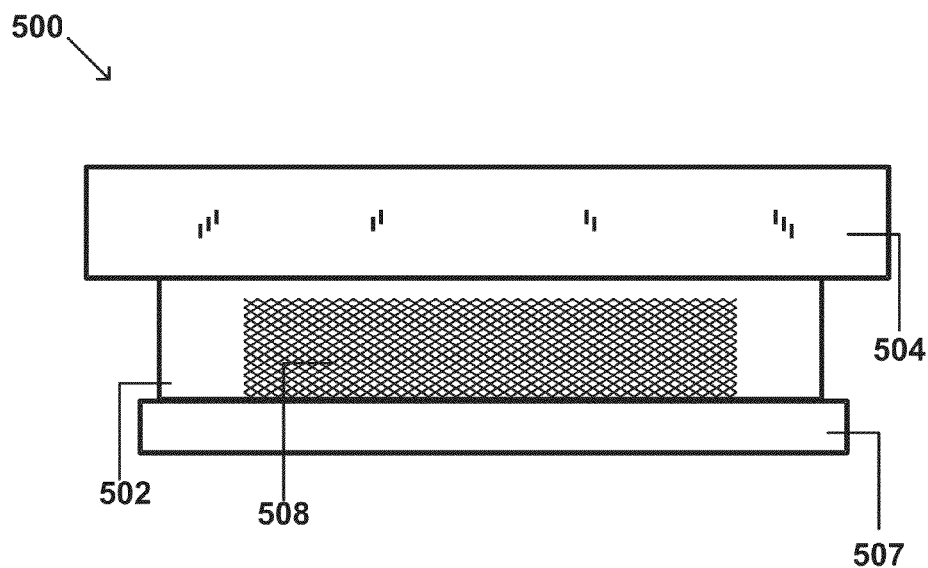

FIG. 8C is a right-side view drawing illustrating an exemplary storm water pretreatment chamber 500. The triangular storm water pretreatment chamber 500 includes a first filter sidewall 502, a first catch rail 504, and a base 507. The first filter sidewall 502 includes a first screen 508 that allows treated storm water to flow out of the storm water pretreatment chamber 500.

Figure 8D:
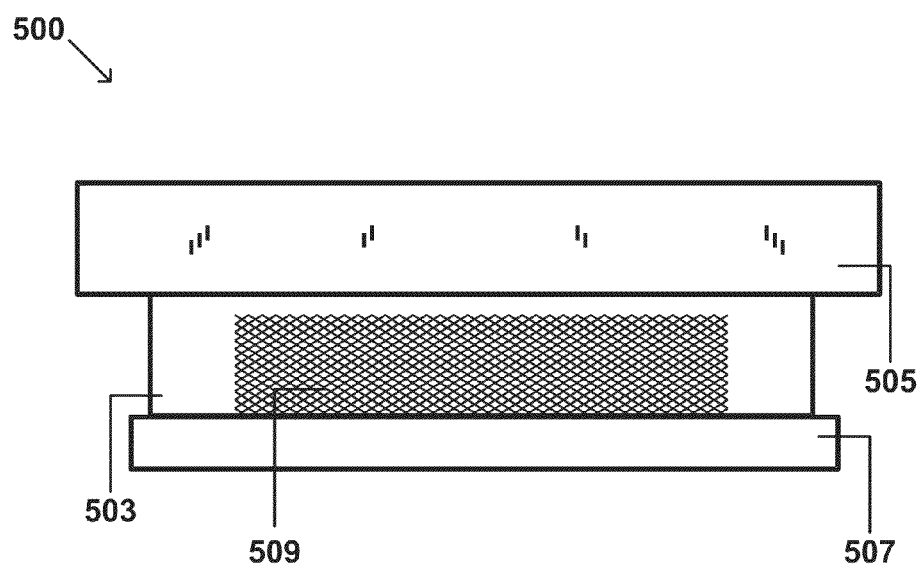

FIG. 8D is a left-side view drawing illustrating an exemplary storm water pretreatment chamber 500. The triangular storm water pretreatment chamber 500 includes a second filter sidewall 503, a second catch rail 505, and a base 507. The second filter sidewall 503 includes a second screen 509 that allows treated storm water to flow out of the storm water pretreatment chamber 500.

Figure 9:
FIG. 9 a block diagram illustrating an exemplary method of treating storm water.

FIG. 9 a block diagram illustrating a method of treating storm water. The method 600 includes: passing storm water through a storm water pretreatment chamber and separating the floating debris and the sediment.

In the claims provided herein, the steps specified to be taken in a claimed method or process may be carried out in any order without departing from the principles of the invention, except when a temporal or operational sequence is explicitly defined by claim language. Recitation in a claim to the effect that first a step is performed then several other steps are performed shall be taken to mean that the first step is performed before any of the other steps, but the other steps may be performed in any sequence unless a sequence is further specified within the other steps. For example, claim elements that recite "first A, then B, C, and D, and lastly E" shall be construed to mean step A must be first, step E must be last, but steps B, C, and D may be carried out in any sequence between steps A and E and the process of that sequence will still fall within the four corners of the claim.

Furthermore, in the claims provided herein, specified steps may be carried out concurrently unless explicit claim language requires that they be carried out separately or as parts of different processing operations. For example, a claimed step of doing X and a claimed step of doing Y may be conducted simultaneously within a single operation, and the resulting process will be covered by the claim. Thus, a step of doing X, a step of doing Y, and a step of doing Z may be conducted simultaneously within a single process step, or in two separate process steps, or in three separate process steps, and that process will still fall within the four corners of a claim that recites those three steps.

Similarly, except as explicitly required by claim language, a single substance or component may meet more than a single functional requirement, provided that the single substance fulfills the more than one functional requirement as specified by claim language.

All patents, patent applications, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Additionally, all claims in this application, and all priority applications, including but not limited to original claims, are hereby incorporated in their entirety into, and form a part of, the written description of the invention.

Applicants reserve the right to physically incorporate into this specification any and all materials and information from any such patents, applications, publications, scientific articles, web sites, electronically available information, and other referenced materials or documents. Applicants reserve the right to physically incorporate into any part of this document, including any part of the written description, the claims referred to above including but not limited to any original claims.

What is claimed is:
1. A storm water pretreatment chamber comprising;
   one or more curved filter sidewalls;
   one or more curved water-impermeable sidewalls each independently connected to the one or more curved filter sidewalls;
      wherein the one or more curved filter sidewalls and the one or more curved water-impermeable sidewalls form a debris and sediment trap,
      wherein the one or more curved filter sidewalls are each in communication with the atmosphere and in posi- tion to release treated storm water from the debris and sediment trap into one or more storm water receiving features;

one or more chamber grates each having a first surface and a second surface, wherein each second surface of the one or more chamber grates is on or connected with the one or more curved filter sidewalls or the one or more curved filter sidewalls and the one or more curved water-impermeable sidewalls, wherein the one or more chamber grates are in communication with the atmosphere and in position to receive untreated storm water and to collect one or more floating debris that does not pass through the one or more chamber grates;

one or more curved catch rails each independently connected to the one or more curved filter sidewalls or the one or more curved water-impermeable sidewalls to form an open top in the storm water pretreatment chamber, wherein the one or more curved catch rails are configured to provide one or more openings directed away from the one or more storm water receiving features, wherein the one or more curved catch rails each independently catch the one or more floating debris, wherein the one or more curved catch rails are positioned above a level of one or more storm water conveyances;

wherein the open top in the storm water pretreatment chamber is positioned below the level of the one or more storm water conveyances, and wherein the storm water pretreatment chamber has an opening between the one or more curved filter sidewalls, the one or more curved catch rails, and the one or more chamber grates that enables storm water to flow out of the debris and sediment trap and into the one or more storm water receiving features when the one or more curved filter sidewalls is clogged.

2. The storm water pretreatment chamber of claim 1, further comprising a base having a first surface and a second surface, wherein the first surface is connected to the ground adjacent the one or more storm water receiving features, wherein the second surface contacts the one or more curved filter sidewalls and the one or more curved water-impermeable sidewalls.

3. The storm water pretreatment chamber of claim 2, wherein the base comprises a water-impermeable base comprising concrete.

4. The storm water pretreatment chamber of claim 1, wherein the one or more curved water-impermeable sidewalls comprise one or more wood-plastic composite sheets.

5. The storm water pretreatment chamber of claim 1, wherein the one or more curved filter sidewalls comprise one or more filters.

6. The storm water pretreatment chamber of claim 5, wherein the one or more filters each independently comprise one or more plastic coated woven fiberglass screens, one or more rubber coated woven fiberglass screens, or one or more plastic and rubber coated woven fiberglass screens in an anodized aluminum frame.

7. The storm water pretreatment chamber of claim 5, wherein the one or more filters each independently comprise openings that are smaller than the openings in the one or more chamber grates.

8. The storm water pretreatment chamber of claim 1, further comprising one or more piers each supporting the one or more curved filter sidewalls, the one or more curved water-impermeable sidewalls, the one or more chamber grates, the one or more curved catch rails, or a combination thereof.

9. The storm water pretreatment chamber of claim 1, wherein the debris and sediment trap collects materials that are smaller than the openings of the one or more chamber grates and larger than the openings in the one or more curved filter sidewalls.

10. The storm water pretreatment chamber of claim 1, wherein the one or more chamber grates comprise one or more cement materials, one or more concrete materials, one or more stone materials, one or more brick materials, one or more wood-plastic composite materials, one or more metals, one or more cement fiberboard materials, one or more fiberglass materials, one or more pressure-treated wood materials, one or more plastic materials, or a combination thereof.

11. The storm water pretreatment chamber of claim 1, wherein the one or more chamber grates cover the debris and sediment trap or the debris and sediment trap and a space between the one or more curved filter sidewalls and the one or more curved catch rails adjacent to the one or more storm water receiving features.

12. The storm water pretreatment chamber of claim 1, wherein the one or more curved catch rails comprise one or more wood-plastic composite sheets, one or more metal sheets, one or more cement fiberboards, one or more fiberglass sheets, one or more pressure-treated wood planks, one or more plastic sheets, or a combination thereof.

13. The storm water pretreatment chamber of claim 12, wherein the one or more curved catch rails each independently comprise one or more wood-plastic composite sheets.

14. The storm water pretreatment chamber of claim 1, wherein the storm water pretreatment chamber comprises a circular chamber grate, a circular filter sidewall, and one circular catch rail.

15. The storm water pretreatment chamber of claim 14, wherein the circular catch rail is configured to provide an opening into the storm water pretreatment chamber opposite to one storm water receiving feature.

16. A circular storm water pretreatment chamber comprising:

a circularly-curved filter sidewall;
a circularly-curved water-impermeable sidewall connected to the circularly-curved filter sidewall,
  wherein the circularly-curved filter sidewall and circularly-curved water-impermeable sidewall form a debris and sediment trap,
  wherein the circularly-curved filter sidewall is in communication with the atmosphere and in position to release treated storm water from the debris and sediment trap into a storm water receiving feature;
a circular chamber grate having a first surface and a second surface,
  wherein the second surface of the circular chamber grate is on or connected with the circularly-curved filter sidewall or the circularly-curved filter sidewall and the circularly-curved water-impermeable sidewall,
  wherein the circular chamber grate is in communication with the atmosphere and in position to receive untreated storm water and to collect one or more floating debris that does not pass through the circular chamber grate;
a circularly-curved catch rail connected to the circularly-curved filter sidewall or the circularly-curved water-impermeable sidewall to form an open top in the circular storm water pretreatment chamber, wherein the circularly-curved catch rail is configured to provide an opening into the circular storm water pretreatment chamber opposite from the storm water receiving feature, wherein the circularly-curved catch rail catches the one or more floating debris, wherein the circularly-curved catch rail is positioned above the level of a storm water conveyance;

wherein the open top in the circular storm water pretreatment chamber is positioned below the level of the storm water conveyance; and wherein the circular storm water pretreatment chamber has an opening between the circularly-curved filter sidewall, the circularly-curved catch rail, and the circular chamber grate that enables storm water to flow out of the debris and sediment trap and into the storm water receiving feature when the circularly-curved filter sidewall is clogged.

17. The circular storm pretreatment chamber of claim 16, further comprising a base having a first surface and a second surface.

18. The circular storm pretreatment chamber of claim 17, wherein the first surface is connected to the ground adjacent the storm water receiving feature, and wherein the second surface contacts the circularly-curved filter sidewall and the circularly-curved water-impermeable sidewall.

19. The circular storm water pretreatment chamber of claim 17, wherein the base comprises a concrete slab.

20. A method of treating storm water comprising;
passing storm water through a storm water pretreatment chamber, wherein the storm water pretreatment chamber comprises:
one or more curved filter sidewalls;
one or more curved water-impermeable sidewalls each independently connected to the one or more curved filter sidewalls;
wherein the one or more curved filter sidewalls and the one or more curved water-impermeable sidewalls form a debris and sediment trap,
wherein the one or more curved filter sidewalls are each in communication with the atmosphere and in position to release treated storm water from the debris and sediment trap into one or more storm water receiving features;

one or more chamber grates each having a first surface and a second surface, wherein each second surface of the one or more chamber grates is on or connected with the one or more curved filter sidewalls or the one or more curved filter sidewalls and the one or more curved water-impermeable sidewalls, wherein the one or more chamber grates are in communication with the atmosphere and in position to receive untreated storm water and to collect one or more floating debris that does not pass through the one or more chamber grates;

one or more curved catch rails each independently connected to the one or more curved filter sidewalls or the one or more curved water-impermeable sidewalls to form an open top in the storm water pretreatment chamber, wherein the one or more curved catch rails are configured to provide one or more openings directed away from the one or more storm water receiving features, wherein the one or more curved catch rails each independently catch the one or more floating debris, wherein the one or more curved catch rails are positioned above a level of one or more storm water conveyances;

wherein the open top in the storm water pretreatment chamber is positioned below the level of the one or more storm water conveyances, wherein the storm water pretreatment chamber has an opening between the one or more curved filter sidewalls, the one or more curved catch rails, and the one or more chamber grates that enables storm water to flow out of the debris and sediment trap and into the one or more storm water receiving features when the one or more curved filter sidewalls is clogged; and separating the floating debris and the sediment.

* * * * *